United States Patent [19]

Beck et al.

[11] Patent Number: 5,348,687
[45] Date of Patent: Sep. 20, 1994

[54] M41S MATERIALS HAVING NONLINEAR OPTICAL PROPERTIES

[75] Inventors: Jeffrey S. Beck, Princeton; Guenter H. Kuehl, Cherry Hill; David H. Olson; John L. Schlenker, both of Pennington, all of N.J.; Galen D. Stucky, Santa Barbara, Calif.; James C. Vartuli, West Chester, Pa.

[73] Assignee: Mobil Oil Corp., Fairfax, Va.

[21] Appl. No.: 157,549

[22] Filed: Nov. 26, 1993

[51] Int. Cl.⁵ .................. G02B 1/02; H01L 31/0264; H01L 31/0344
[52] U.S. Cl. ................................. 252/582; 252/584; 252/501.1; 252/518; 524/450; 423/718
[58] Field of Search ............... 423/718; 252/501.1, 252/518, 582, 584; 524/444, 450

[56] References Cited

U.S. PATENT DOCUMENTS

| | | | |
|---|---|---|---|
| 4,552,855 | 11/1985 | Ozin et al. | 502/74 |
| 4,759,820 | 7/1988 | Calvert et al. | 252/582 X |
| 4,885,113 | 12/1989 | Gillbery-LaForce et al. | 252/582 |
| 4,933,111 | 6/1990 | Buckley et al. | 252/582 |
| 4,937,017 | 6/1990 | Gillbery-LaForce et al. | 252/582 |
| 4,942,119 | 7/1990 | Ozin et al. | 423/DIG. 32 X |
| 5,008,234 | 4/1991 | Ozin et al. | 502/326 |
| 5,057,296 | 10/1991 | Beck | 423/277 |
| 5,098,684 | 3/1992 | Kresge et al. | 423/718 |
| 5,102,643 | 4/1992 | Kresge et al. | 423/702 |
| 5,110,505 | 5/1992 | Herron et al. | 252/518 |
| 5,132,051 | 7/1992 | Herron et al. | 252/501.1 |
| 5,145,816 | 9/1992 | Beck et al. | 502/60 |
| 5,162,939 | 11/1992 | Herron et al. | 359/326 |
| 5,234,758 | 8/1993 | Olsen et al. | 428/323 |

FOREIGN PATENT DOCUMENTS

| | | | |
|---|---|---|---|
| 0287093 | 10/1988 | European Pat. Off. | 252/584 |
| 0241527 | 10/1988 | Japan | 252/501.1 |
| 4027922 | 1/1992 | Japan | 252/582 |

OTHER PUBLICATIONS

Ozin, G. A., et al., "Advanced Zeolite Materials Science", *Angew. Chem. Int. Ed. Engl.* 28: 359-376 (1989). (No Month).

Cox, S. D., et al., "Second Harmonic Generation by the Self-Aggregation of Organic Guests in Molecular Sieve Hosts", *Chem. Mater.* 2: 606-619 (1990). (NO Month).

Stucky, G. D., et al., "Quantum Confinement and Host/Guest Chemistry: Probing a New Dimension", *Science* 247: 669-678 (1990). (Feb).

Wells, R. L., et al., "Preparation of a Novel Gallium Arsenide Single-Source Precursor Having the Empirical Formula $AsCl_3Ga_2$", *Chem Mater.* 3: 381-382 (1991). (No Month).

G. Stucky, "Nanochemistry and Nanoclusters: The Beginning of Matter", *Naval Research Reviews (Cluster Science)* (3) XLIII, 28-59 (1991). (No Month).

G. Ozin, "Nonochemistry: Synthesis in Diminishing Dimensions", *Advanced Materials* 4, 612-649 (1992). Oct.

*Primary Examiner*—Mark L. Bell
*Assistant Examiner*—David R. Sample
*Attorney, Agent, or Firm*—Alexander J. McKillop; Malcolm D. Keen; Dennis P. Santini

[57] ABSTRACT

A material exhibiting third order nonlinear optic properties includes quantum size clusters of semiconducting guest material incorporated into the pores of M41S material in an arrangement to provide nonlinear optic properties.

A material exhibiting second order nonlinear optic properties includes an organic guest material incorporated into the pores of M41S material so that a non-centrosymmetric structure is formed which will provide second harmonic generation when subjected to electromagnetic radiation of a selected frequency.

16 Claims, 3 Drawing Sheets

M41S MATERIALS HAVING NONLINEAR OPTICAL PROPERTIES

BACKGROUND OF THE INVENTION

1. Field of the Invention

This invention relates to a novel composition of synthetic ultra-large pore crystalline material exhibiting nonlinear optical characteristics, and a method for its preparation.

2. Description of the Prior Art

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to described these materials is "X-ray indifferent". The microstructure of the silicas consists of 100–250 Angstrom particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pore sizes tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54–59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolite material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content.

Aluminum phosphates are taught in the U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F.d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the JCPDS International Center for Diffraction Data card number 15–274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12–13 Angstroms in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356–358 (1983) to have a framework structure containing very large channels with a calculated free pore diameter of 14.2 Angstroms. R. Szostak et al., *Zeolites: Facts, Figures, Future*, Elsevier Science Publishers B.V., 1989, present work showing cacoxenite as being very hydrophilic, i.e. adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

NON LINEAR OPTICS

Nonlinear optical (NLO) components find applications in diverse areas of optoelectronics including optical communication, laser scanning and control functions, and integrated optics technology.

The field of nonlinear optics is concerned with introduction of electric fields in a medium in such a way as to produce a new field altered in phase, amplitude, frequency, or other propagation characteristics. Adjunct characteristics of the medium such as ease of preparation, compatibility with microelectronic processing methods, adhesion, mechanical and other properties are often the factors which determine the technological utility of nonlinear optical materials. Adjunct properties remain the main obstacle to application and constitute the major challenge for chemical research. Categories of application for nonlinear optical materials find specific applications in devices such as frequency doublers, frequency mixers and parametric amplifiers.

Media exhibiting NLO effects are known to consist in certain cases of porous crystalline aluminosilicate or aluminophosphate molecular sieves loaded with organic guest molecules packed in a polar arrangement. In these cases the zeolite species must display ideal pore dimensions for the alignment of these aromatic sorbates. As described by Cox, S. D. et al., "Second Harmonic Generation by the Self-Aggregation of Organic Guests in Molecular Sieve Hosts", *Chem. Mater.* 2 (1990) 609, a nonlinear optical material has been provided by loading the pores of a molecular sieve with an organic guest. Specifically, p-nitroaniline was loaded into an acentric zeolite, ALPO-5. The resulting structure showed maximum second harmonic generation (SHG) at full loading. In contrast, the same organic guest loaded in Zeolites Omega and Mordenite showed no SHG. These zeolites are centrosymmetric. 2-methyl-p-nitroaniline, which shows SHG by itself, was found to lose this property when loaded in ALPO-5. It is apparent that various host-gest interactions are important with respect to NLO properties which may be obtained through the use of molecular sieves.

The polarization (coulomb/meter$^2$) produced in a medium by a local field may be expressed in terms of a Taylor series expansion:

$$P_i = \alpha_{ijk}E(\omega) + \beta_{ijk}E_j(\omega)E_k(\omega) + \gamma_{ijkl}E_j(\omega)E_k(-\omega)E_l(\omega) + \ldots$$

where $\alpha_{ij}, \beta_{ijk}$, and $\gamma_{ijkl}$, are, respectively the components of a second order, third order, and fourth order tensor. The nonlinear terms give rise to nonlinear effects. Tensor components above second order characterize the nonlinear response of the medium to the applied local field.

SECOND-ORDER NONLINEARITY

The two main second-order NLO effects which are exploited in electronic devices are linear electro-optic (LEO) modulation and second harmonic generation (SHG).

When an NLO-crystal is illuminated by electromagnetic radiation of frequencies $\omega_1$ and $\omega_2$, then the result of the $\beta_{ijk}$ term in the local field expansion or of $\chi^{(2)}_{ijk}$ in the applied field expansion is the generation of an electromagnetic field frequency $(\omega_1 + \omega_2)$ and $(\omega_1 - \omega_2)$. When the two fields have the same frequency $(\omega_1 + \omega_2)$ (are degenerate), the sum frequency is generated at $2\omega$ or double the fundamental frequency. A well known frequency-doubler of infrared radiation from the Nd:YAG($\lambda = 1.06$ μm) to a green line($\lambda/2 = 0.053$ μm or 532 nm) in the optical spectrum is KTP (KTiOPO$_4$).

Passage of light through a second-order nonlinear optical material must also produce a static (DC) (in addition to the second harmonic) field (potential) across the material —a phenomenon termed "optical rectification." All NLO materials will be characterized by a third rank tensor property called the electro-optical coefficient tensor. The components of this tensor are related to the second-order susceptibility, $\chi^{(2)}_{ijk}$. In LEO modulation a light beam is passed through a material subjected to an electric field via attached electrodes. The applied field causes shifts in polarization and/or phase which can be converted into amplitude changes by interference with the main beam (Mach-Zehnder interferometer) or by means of a polarization device.

THIRD-ORDER NONLINEARITY

Third-order nonlinear optical effects include the Kerr effect, optical bistability, optical phase conjugation, photorefractivity, and third harmonic generation (THG). Applications of these effects include optical switching, amplification, beam steering and clean-up, and image processing. There are no symmetry constraints relating to the appearance of third-order susceptibility. Both single crystals and powders have potential utility. Large single crystals are not required. Within certain limits, fabricability may be as important as the magnitude of the effect. The effects are of two kinds: (1) those that influence the local index of refraction ($n_2$ effects), (2) those that influence the absorption (resonant or photochromatic effects). In all of these, the behavior of one light beam is influenced in some way by the presence of another.

As discussed generally by Ozin et al. in *Angew. Chem. Int. Ed. Engl.* 28 (1988) 359–376, various potential applications for zeolites have been recognized. These include hydrocarbon conversion, gas separation, zeolite electrodes and electron relays, intrazeolite semiconductors, and optozeolite chemical sensors, just to name a few.

Semiconductor materials, such as CdS, CdSe and PbS, all of which are relatively narrow band width semiconductors, have been incorporated within zeolites. Quantum structures may accordingly be obtained wherein the physical properties (e.g. electrical, optical and magnetic) differ from those of the same materials in bulk form. Quantum well effects have long been known in semiconductor heterostructures prepared by molecular-beam epitaxy.

The properties of molecular sieves loaded with various materials are dependent upon a number of factors. The physical structures of the sieve and the guest material are two such factors. Others include interactions between the host and guest materials as well as guest-guest interactions.

Most molecular sieves have relatively small pore sizes. As there is no way of tailoring the pore sizes of such sieves, there is nothing one can do but use a different sieve if the pore size of the first chosen sieve is inappropriate. Using a different sieve, however, changes many variables other than pore size, some of which may be unpredictable.

Thermal stability of a host material is usually preferable. Most known large pore molecular sieve materials are thermally unstable. Materials such as glass are thermally stable, but are amorphous.

A mesoporous crystalline material has been recently developed which offers thermal stability and uniformity in pore size. The average pore size thereof may be tailored during the manufacturing process for a particular use. Specifically, the material may be fabricated to provide an inorganic, porous, non-layered phase having an arrangement of uniformly-sized pores with a maximum perpendicular cross-section pore dimension of at least about 13 Angstroms, and within the range of about 13 Angstroms to about 200 Angstroms. U.S. Pat. Nos. 5,098,684, 5,102,643 and 5,145,816 the disclosures of which are incorporated by reference herein, describe the mesoporous crystalline material and a number of techniques for synthesizing such a material.

SUMMARY OF THE INVENTION

The present invention is directed to a composition of matter which comprises:

an inorganic, non-layered, porous crystalline phase material having, after calcination, an arrangement of uniformly-sized pores having diameters of at least about 13 Angstrom Units, exhibiting an X-ray diffraction pattern with at least one peak at a position greater than about 18 Angstrom United d-spacing and exhibiting a benzene adsorption capacity of greater than about 15 grams benzene per 100 grams at 50 torr and 25° C., and incorporated within said pores, quantum size clusters of inorganic or organic semiconducting material. The phase material preferably has a hexagonal arrangement of uniformly-sized pores at least about 13 Angstrom Units in diameter and exhibiting, after calcination, a hexagonal diffraction pattern that can be indexed with a $d_{100}$ value greater than 18 Angstrom Units. The pore size of the phase material is selected to provide together with the guest material, the properties which are considered most desirable in the resulting host-guest system. It may be desirable in some instances for the host to exert a large influence on the confined guest. In such cases, the pore diameter should not greatly exceed the diameter of the guest particles. Semiconductor materials having relatively large band gaps, such as copper halides, are among the guest materials which require confinement in order to more readily transfer electrons. Larger pores may be employed where the band gap is relatively small. Semiconductor materials such as germanium and gallium arsenide have relatively small band gaps. When incorporated as clusters within the host material, the clusters themselves will tend to confine the electrons. The host material accordingly is not required to provide this function. Although it is not required to confine the electrons of certain semiconductor materials having narrow band gaps, it may nevertheless be desirable to select relatively small pore diameters for other reasons, such as limiting cluster or crystal size. The production of substantially homogeneous semiconductor superlattices from the interconnection of quantum "dots" is preferably accomplished through the use of relatively small pore diameters of the host material. It will be appreciated that the term "relatively small" as used in connection with the hose material described above is actually quite large in comparison to conventional molecular sieves having thermal stability.

DETAILED DESCRIPTION OF THE INVENTION

Figure 1:
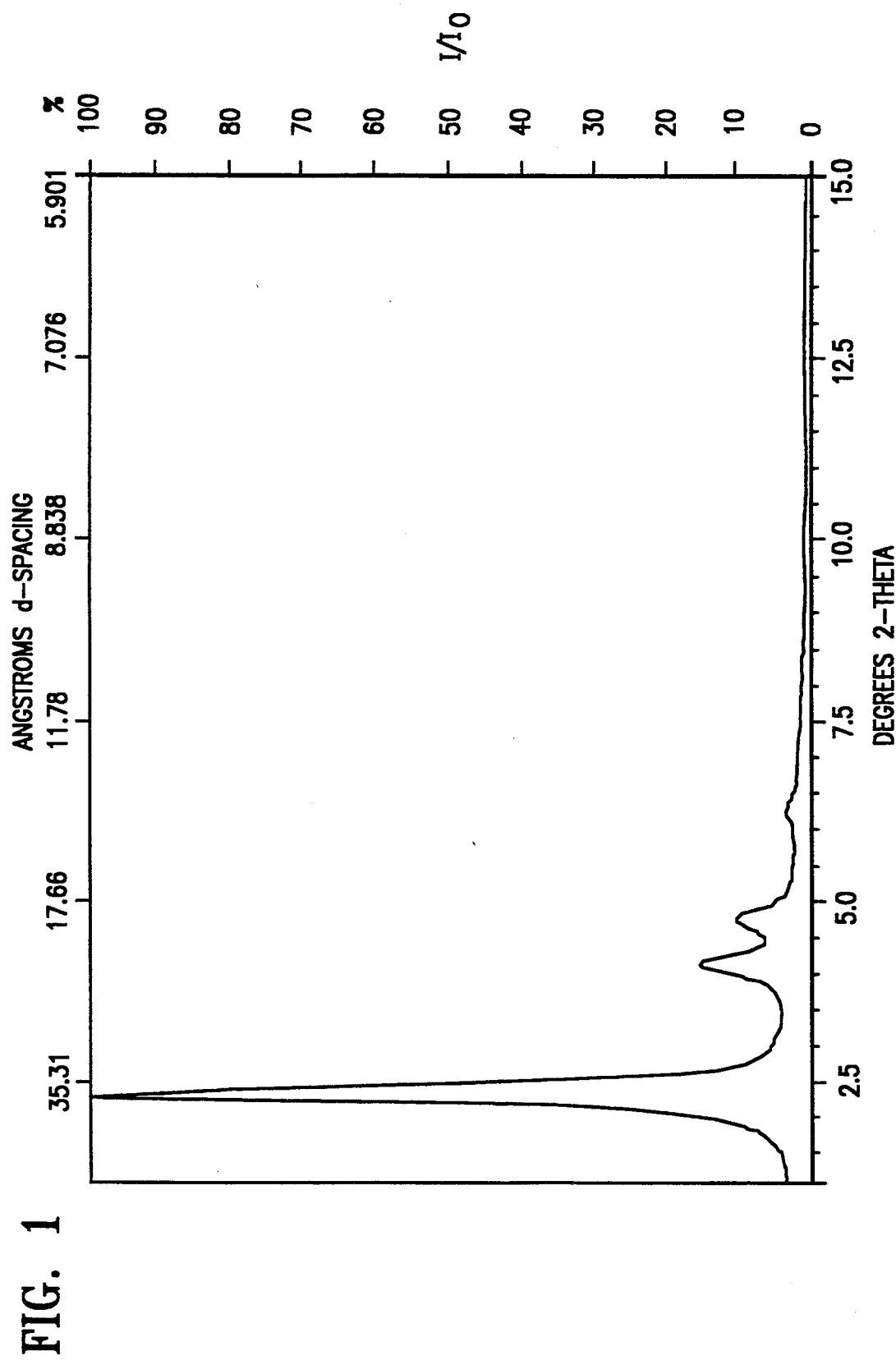
FIG. 1 is an X-ray diffraction pattern of the product of Example 1.

The present invention is directed to a composition of matter exhibiting unique properties, such as NLO properties, which is comprised of the host material described above and a guest material comprising quantum size clusters of an inorganic semiconducting material. The pore size of the host material is in a selected range which depends upon the nature of the guest. The guest material may not only vary in size, but also in the geometry it assumes while confined within a pore.

Non-linear optic (NLO) devices utilize the optical properties of semiconductor guest materials. Semiconductors are materials which exhibit conductivities intermediate between metals and insulators. The guest materials may be inorganic or organic.

THIRD ORDER NONLINEARITY

For third order non-linear optic effects guest materials may be single elemental such as C, Ge or Si, binary, or ternary such as $LiNbO_2$.

Binary compounds can consist of an element in combination with an element of another column in the periodic table such as III–V, II–VI and IV–VI. Accordingly, the III–V family includes, for example, AlSb, BN, BP, GaN, GaSb, GaAs, GaP, InSb, InAs, InP. The II–VI family includes, for example, ZnS and CdS which are often used in photoconductive devices; also CdSi, CdTe and ZnO. The IV–VI family includes, for example, PbS, PbSe and PbTe which are sensitive in photoconductivity.

In constructing confined quantum dots for NLO application, it is desirable that the crystal size be controlled and that the crystallites bear some special ordering with respect to each other. By utilizing M41S materials, such arrangement is possible. Surface hydroxyl groups of M41S can anchor one atomic component of a semiconducting material and the second component introduced via gas or liquid phase for reaction with the first component. Loading with gallium arsenide or lead iodide will be used as non-limiting examples.

The decomposition of Lewis acid base couples of III–V materials at M41S internal silanol sites can utilize group III metal-organic compounds and group V hydrogen compounds as follows:

$$Si-OH + Ga(CH_3)_3 \rightarrow Si-O-Ga(CH_3)_2 + CH_4.$$

The $Si-O-Ga(CH_3)_2$ is then reacted with $AsR_3$/additional reductant (R = H, X, alkane, etc.) at high temperature to produce the desired GaAs material. This type of reaction results in the formation of isolated deposited particles of GaAs at available M41S silanol sites. These particles agglomerate to form larger crystals when heated at, e.g. 400° C.–750° C. The temperature used depends on the metals used and can be determined with routine experimentation.

A commonly used process for the epitaxial growth of binary compounds such as III–V is chemical vapor deposition. For example, GaAs may be prepared by the reaction of trimethylgallium (($CH_3)_3Ga$) and $AsH_3$, trimethyl or tertiary butyl arsine in hydrogen at about 550° C. to 750° C. The reaction ultimately leads to the production of GaAs via methane elimination.

Traditional gas phase decomposition of the GaAs from volatile precursors can be initiated by sorption/decomposition. For example, $(CH_3)_3Ga$ and $(CH_3)_3As$ can be sorbed into the pore system thus forming the adduct $(CH_3)_3Ga:As(CH_3)_3$ within the pore. Subsequent thermal treatment results in the loss of the alkane and formation of GaAs within the pore. The crystal size and morphology is constrained by the pore dimensions.

In another embodiment a halogen transport reaction may be used as follows: $2\ GaCl_3 + ((CH_3)_3Si)_3As \rightarrow AsCl_3Ga_2 + 3(CH_3)_3SiCl$ which upon heating forms GaAs as follows:

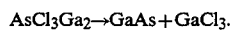

$AsCl_3Ga_2 \rightarrow GaAs + GaCl_3$.

This method allows more strands of GaAs to be generated per $cm^2$ of external surface area by using M41S of smaller pore size, e.g., 20 Angstroms.

M41S can also be loaded with $AsCl_3Ga_2$ using a solvent method. $GaCl_3$ is dissolved in a solvent which is preferably non-aqueous and the solution is adsorbed into the pores of M41S. The solvent is removed and $((CH_3)_3Si)_3As$ is introduced by absorption into the remaining pore volume from a solvent in which $GaCl_3$ is not soluble. $AsCl_3Ga_2$ is formed within the pores and upon heating, GaAs is formed as described above.

Compounds such as GaAs may be grown as single crystals. For this purpose, the guest loaded M41S is heat-treated in an electric field in order to orient the crystallites to enable them to join and form larger crystals the size of which is limited only by the size of the pore and the III-V compound available within the pores. Single crystals formed in this manner may be liberated by dissolving the M41S materials. The liberated crystals can again be oriented in an electric field. This orientation can be carried out in a dilute solution of a resin, so that the crystals can be fixed in this parallel position by the resin after evaporation of the solvent.

Colloidal solutions of binary compounds may be prepared in solvents such as pyridine or quinoline. Colloidal particles, e.g., 30 Angstrom particles of GaAs, can be allowed to aggregate to strands in the pores of M41S materials of a pore diameter greater than 30 Angstroms, e.g., 40 Angstroms. The M41S preferably contains essentially no aluminum. The strand aggregation forms so that one side of the M41S particle has the Ga exposed, while the other side has As. Colloidal solutions of Pt, Pd, Au and other metals can also be accommodated within the unusually large pores of M41S.

In another embodiment, crystals of lead iodide ($PbI_2$) can be grown in the interior of the M41S channel by melt/vapor deposition techniques, or by ion exchange of $Pb^{3+}$ followed by treatment with iodine.

Some semiconductors are characterized by layered structures. The interaction within a layer is significantly stronger than that between layers. Semiconductors of this type include $PbI_2$, GaSe and various transition metal dichalcogenides such as $SnSe_2$ and $MoS_2$. Layers can result from repetitions of the loading step. A layering effect also occurs within some semiconducting materials such as in molybdenum sulfide.

Narrow band gap species like CdS, CdSe and PbS can be introduced by ion exchange of the metal, e.g., using a nitrate solution of Cd or Pb followed by exposure to $H_2S$ or $H_2Se$ under thermal conditions.

SECOND ORDER NONLINEARITY

Organometallic compounds may be used as the quest material for second harmonic generation (SHG). Inclusion guests for second harmonic generation are organic conjugated $\pi$-election molecules with attached electron donor and electron attracting groups and with a noncentrosymmetric configuration when incorporated into the M41S mesoporous crystalline material. These inclusion guests are organic molecules and may be called sorbates or chromophores.

Known inclusion guests of this type include p-nitroaniline (NA), N,N-dimethyl-p-nitroaniline (DMNA), N-methyl-p-nitroaniline (NMNA), 2-methyl-4-nitroaniline (MNA), meta-nitroaniline (mNA), 2-amino-4-nitropyridine (ANP), 2-amino-4-nitropyrimidine (ANPm), 4-nitropyridine N-oxide (NPNO), 4-N,N'-(dimethylamino)-4'nitrostilbene (DANS), benzene chromium tricarbonyl (benzene $Cr(CO_3)$), cyclohexadiene iron tricarbonyl (cyclohexadiene Fe($CO)_3$), cyclopentadienylmanganese tricarbonyl (cyclopentadienyl $Mn(CO)_3$), p-amino-p'-nitrobiphenyl, p-amino-p'-nitrodiphenyl, p-amino-p'-nitrodiphenyldiacetylene, p-(methylthio)-p'-nitrophenyldiacetylene, and other diacetylenes.

Other nonlinear optically active organic compounds are 13,13-diamino-14,14-dicyanodiphenoquinodimethane, and similar - quinodimethanes such as tetracyano quinodimethane (TCNQ) salts.

The organometallic compounds possess large second order polarizabilities and pi conjugated systems.

For guest-host inclusion complexation of organometallic sorbates into M41S, an organic compound such as thiourea is dissolved in a solvent such as methanol and the solution is sorbed into M41S substrate structure. Then the organometallic compound such as benzene chromium tricarbonyl ($C_6H_5Cr(CO)_3$) is dissolved in a solvent in which it is soluble and this solution introduced into the M41S. After the solvent is evaporated, the inclusion compound thiourea-$C_6H_5Cr(CO_3)$ will form. Because this material has been crystallized within the pore of the M41S substrate, the inclusion compound will arrange in a specific order because of the specific geometry of the pore.

In accordance with another embodiment of the invention, organic materials are incorporated within the pores of a host material as described above. The host material is preferably a high-silica structure containing essentially no aluminum. (The high-silica structure is also believed to be preferable for the systems described above containing inorganic semiconductor materials). As where inorganic materials are incorporated within the host material, the pore size and structure will at least partially influence the properties of the guest-host system. If the host material is to contribute significantly to the orientation of the guest, the pore size thereof should be relatively small so that the walls defining each pore can exert maximum influence upon the guest. Alternatively, if the primary function of the host material is simply to provide support for or enhance the thermal stability of an organic guest, the pores should be relatively large in comparison to the guest molecules or crystals. The guest-host system provided by this embodiment of the invention preferably exhibits SHG properties.

Mesoporous Crystalline Material

As demonstrated hereinafter, the inorganic, non-layered mesoporous crystalline material of this invention has the following composition:

$$M_{n/q}(W_aX_bY_cZ_dO_h)$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c and d are mole fractions of W, X, Y and Z, respectively; h is a number of from 1 to 2.5; and $(a+b+c+d)=1$.

A preferred embodiment of the above crystalline material is when $(a+b+c)$ is greater than d, and $h=2$. A further embodiment is when a and $d=0$, and $h=2$.

In the as-synthesized form, the material of this invention has a composition, on an anhydrous basis, expressed empirically as follows:

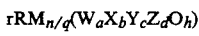

$$rRM_{n/q}(W_aX_bY_cZ_dO_h)$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g. sodium ions of the as-synthesized material of this invention can be replaced in accordance with techniques well known in the art, at least in part, by ion exchange with other ions. Preferred replacement ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Group IA (e.g. K), IIA (e.g. Ca), VIIA (e.g. Mn), VIIIA (e.g. Ni), IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

The crystalline (i.e. meant here as having sufficient order to provide a diffraction pattern such as, for example, by X-ray, electron or neutron diffraction, following calcination with at least one peak) mesoporous material of this invention may be characterized by its structure, including extremely large pore windows, and high sorption capacity. The term "mesoporous" is used here to indicate crystals having uniform pores within the range of at least about 13 Angstroms or from about 13 Angstroms to about 200 Angstroms. The materials of this invention will have uniform pores within the range of from about 13 Angstroms to about 200 Angstroms, more usually from about 15 Angstroms to about 100 Angstroms. For the purposes of this application, a working definition of "porous" is a material that adsorbs at least 1 gram of a small molecule, such as Ar, $N_2$, n-hexane or cyclohexane, per 100 grams of the solid.

The material of the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. In one form the material appears to have a hexagonal arrangement of large channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

Some of these preparations of the material of the present invention give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20-40 distinct spots observable in the electron diffraction patterns. These patterns can be indexed with the hexagonal hkO subset of unique reflections of 100, 110, 200, 210, etc., and their symmetry-related reflections.

In its calcined form, the crystalline material of the invention may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 tort and 25° C. This sorption is based on the assumption that the crystal material has been treated if necessary in an attempt to insure no pore blockage by incidental contaminants.

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials. e.g. silica, and organics may be removed by contact with acid or base or other chemical agents such that the detrital material will be removed without detrimental effect on the crystal of the invention.

More particularly, the calcined crystalline non-layered material of the invention may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material of this invention will have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, the calcined inorganic, non-layered crystalline material of the invention is characterized as having a pore size of about 13 Angstroms or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 450° C.–700° C. or about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

The composition can be subjected to treatment to remove part or all of any organic constituent. Components such as tungsten, vanadium, molybdenum, rhenium, nickel, cobalt, chromium, manganese, or a noble metal such as platinum or palladium or mixtures thereof can be in the composition by way of co-crystallization, exchanged into the composition to the extent a Group IIIB element, e.g. aluminum, is in the structure, impregnated therein or intimately physically admixed therewith. Such component can be impregnated in or on to it such s, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 370° C. or 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 925° C., or up to 750° C. with the hexagonal form.

The crystalline material can be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

Synthesis of the Crystalline Material

The usual method for synthesis of the ultra-large pore crystalline material involves preparation of a particular reaction mixture comprising sources of alkali or alkaline earth metal cation, if desired, one or a combination of oxides selected from the group consisting of divalent element, trivalent element, tetravalent element and pentavalent element, an organic directing agent and solvent or solvent mixture, maintaining said mixture under sufficient conditions of pH, temperature and time for formation of said composition of matter, and recovering said composition of matter. In this usual method, the organic directing agent is an ion of the formula $R_1R_2R_3R_4Q+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof. The compound from which the above organic directing agent ammonium or phosphonium ion is derived may be, for example, the hydroxide, halide, silicate or mixture thereof. The solvent or solvent mixture for use in the usual method comprises a $C_1$-$C_6$ alcohol, $C_1$-$C_6$ diol, water or mixture thereof, with water preferred.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, hereinafter more particularly described. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, such as, for example, $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second method for synthesis of the present crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, hereinafter more particularly described. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each hereinafter more particularly described, and solvent or solvent mixture, such as, for example, $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 20 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the present crystalline material is where X comprises aluminum and Y comprises silicon, the crystallization temperature must be from about 25° C. to about 175° C., preferably from about 50° C. to about 150° C., and an organic directing agent, hereinafter more particularly described, or, preferably a combination of that organic directing agent plus an additional organic agent, hereinafter more particularly described, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 2 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

A fifth method includes adding an auxiliary organic to the reaction mixture prior to maintaining it for crystallization of the ultra-large pore crystalline material, such as prior to, during or immediately following addition of the other reaction mixture components. It is believed that the "primary template" in this method becomes the mixture of the auxiliary organic and the organic directing agent or organic directing agent mixture. This auxiliary organic must be selected from the group of organic compounds consisting of (1) aromatic hydrocarbons and amines of from 5 to 20 carbons and halogen- and $C_1$-$C_{14}$ alkyl-substituted derivatives thereof, (2) cyclic aliphatic hydrocarbons and amines of from 5 to 20 carbons and halogen and $C_1$-$C_{14}$ alkyl-substituted derivatives thereof, (3) polycyclic aliphatic hydrocarbons and amines of from 6 to 20 carbons and halogen- and $C_1$-$C_4$ alkyl-substituted derivatives thereof, (4) straight and branched aliphatic hydrocarbons and amines of from 3 to 16 carbons and halogen-substituted derivatives thereof, and (5) combinations thereof. Of this group of organic compounds, the aromatic hydrocarbons (e.g. $C_6$-$C_{20}$), cyclic aliphatic hydrocarbons and polycyclic aliphatic hydrocarbons, and combinations thereof, are preferred.

In this group of auxiliary organic compounds for use in the present improved method, the halogen substituent in substituted derivatives may be, for example, bromine. The $C_1$-$C_{14}$ alkyl substituent in the substituted derivatives may be linear or branched aliphatic chains, such as, for example, methyl, ethyl, propyl, isopropyl, butyl, pentyl and combinations thereof. Non-limiting examples of these auxiliary organics include, for example, p-xylene, trimethylbenzene, triethylbenzene and triisopropylbenzene.

With the inclusion of the auxiliary organic into the reaction mixture, the mole ratio of auxiliary organic-/$YO_2$ will be from about 0.05 to about 20, preferably from about 0.1 to about 10, and the mole ratio of auxiliary organic/$R_{2/f}O$ will be from about 0.02 to about 100, preferably from about 0.05 to about 35. The useful range of temperatures for this crystallization is from about 25° C. to about 175° C., preferably from about 50° C. to about 150° C. Pore size and volume will vary with the amount and physical properties, e.g. structure, boiling point, density, polarity, etc., of the auxiliary organic used.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

Non-limiting examples of various combinations of W, X, Y and Z contemplated for the first and second synthesis methods of the present invention include:

| W  | X  | Y  | Z |
|----|----|----|---|
| —  | Al | Si | — |
| —  | Al | —  | P |
| —  | Al | Si | P |
| Co | Al | —  | P |
| Co | Al | Si | P |
| —  | —  | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

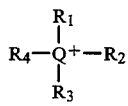

wherein Q is nitrogen or phosphorus and wherein at least one of $R_1R_2$, $R_3$ and $R_4$ is aryl or alkyl of from 6 to about 36 carbon atoms, e.g. $-C_6H_{13}$, $-C_{10}H_{21}$, $-C_{12}H_{25}$, $-C_{14}H_{29}$, $-C_{16}H_{33}$ and $-C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, benzyltrimethylammonium, cetylpyridinium, myristyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

It may be desired to incorporate the new crystal composition with another material. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. These materials may be incorporated with naturally occurring clays, e.g. bentonite and kaolin, to improve the crush strength to prevent the M41S from breaking down into powder-like materials.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix in colloidal form so as to facilitate extrusion of the bound components(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane, benzene and/or n-hexane, they are equilibrium adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 grams/100 grams and more particularly greater than about 20 grams/100 grams.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 dupont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of adsorption isotherm.

In the examples, percentages are by weight unless otherwise indicated.

EXAMPLE 1

A. One hundred grams of a hexadecyltrimethylammonium ($C_{16}Me_3N$)hydroxide solution (prepared by contacting a 29 wt % N,N,N-trimethyl-l-hexadecanaminium chloride solution with a hydroxide-for-halide exchange resin) were combined with 50.6 grams of a tetramethylammonium silicate solution (10% $SiO_2$,0.5 $TMA/SiO_2$), and 34 grams of cetyltrimethylammonium bromide with stirring at approximately 4° C. The pH of this mixture was adjusted to approximately 10.0 by the addition of 51.3 grams 1N $H_2SO_4$ solution. This mixture was placed in polypropylene bottles and put in a steambox at 100° C. for 48 hours. The resulting solid product was recovered by filtration and dried in air at ambient temperature.

The chemical analysis of the as-synthesized product were:

| | |
|---|---|
| C | 47.5 wt. % |
| Al | <0.25 wt. % |
| N | 2.39 wt. % |
| Si | 11.20 wt. % |
| Ash (1000° C.) | 24.67 wt. % |

The product was then calcined at 540° C. for one hour in flowing nitrogen, followed by six hours in flowing air.

The X-ray diffraction pattern of the calcined product was that of M41S.

B. The synthesis as in paragraph A was repeated except that the pH of the reaction mixture was adjusted to about 10 by the addition of 50.0 grams 1N $H_2SO_4$ solution.

The chemical analysis of the as-synthesized product were:

| | |
|---|---|
| C | 32.6 wt. % |
| Al | <0.13 wt. % |
| N | 2.95 wt. % |
| Si | 7.93 wt. % |
| Ash (1000° C.) | 17.49 wt. % |

The product was then calcined at 540° C. for one hour in flowing nitrogen followed by six hours in flowing air. The X-ray diffraction pattern of the calcined product was that of M41S.

The Example 1 product was prepared by compositing the preparations of i(A) and I(B). X-ray diffaction pattern of the composite in shown in FIG. 1 and is that of very pure M41S.

EXAMPLE 2

A. One hundred grams of a hexadecyltrimethylammonium ($C_{16}Me_3N$)hydroxide solution (as described in Example 1) were combined with 50.6 grams of a tetramethylammonium silicate solution (10% $SiO_2$, 0.5 $TMA/SiO_2$), 34 grams of cetyltrimethylammonium bromide, and 4.4 grams of a tetramethylammonium aluminate solution (prepared by dissolving 2.6 grams of aluminum wire in 150 grams of 25% tetramethylammonium hydroxide solution) with stirring at approximately 4° C. The pH of this mixture was adjusted to approximately 10.5 by the addition of 55.9 grams 1N $H_2SO_4$ solution. This mixture was placed in polypropylene bottles and put in a steambox at 100° C. for 48 hours. The resulting solid product was recovered by filtration and dried in air at ambient temperature. Found in the as-synthesized product: carbon-47.93 weight %, aluminum-0.40 weight %, nitrogen-3.24 weight %, silicon-9.19 weight % and ash (1000° C.) 20.74 weight %.

The product was then calcined at 540° C. for one hour in flowing nitrogen followed by six hours in flowing air. The X-ray diffraction pattern of the calcined product was that of M41S.

B. The procedure of 2(A) was repeated except that the pH of the reaction mixture was adjusted to about 10.5 by the addition of 51.9 grams of 1N $H_2SO_4$ solution. Found in as-synthesized product: carbon-45.34 weight %, aluminum- 0.59 weight %, nitrogen-2.92 weight %, silicon-12.44 weight % and ash (1000° C.)-23.30 weight %. The X-ray diffraction pattern of the calcined product was that of M41S.

Figure 2:
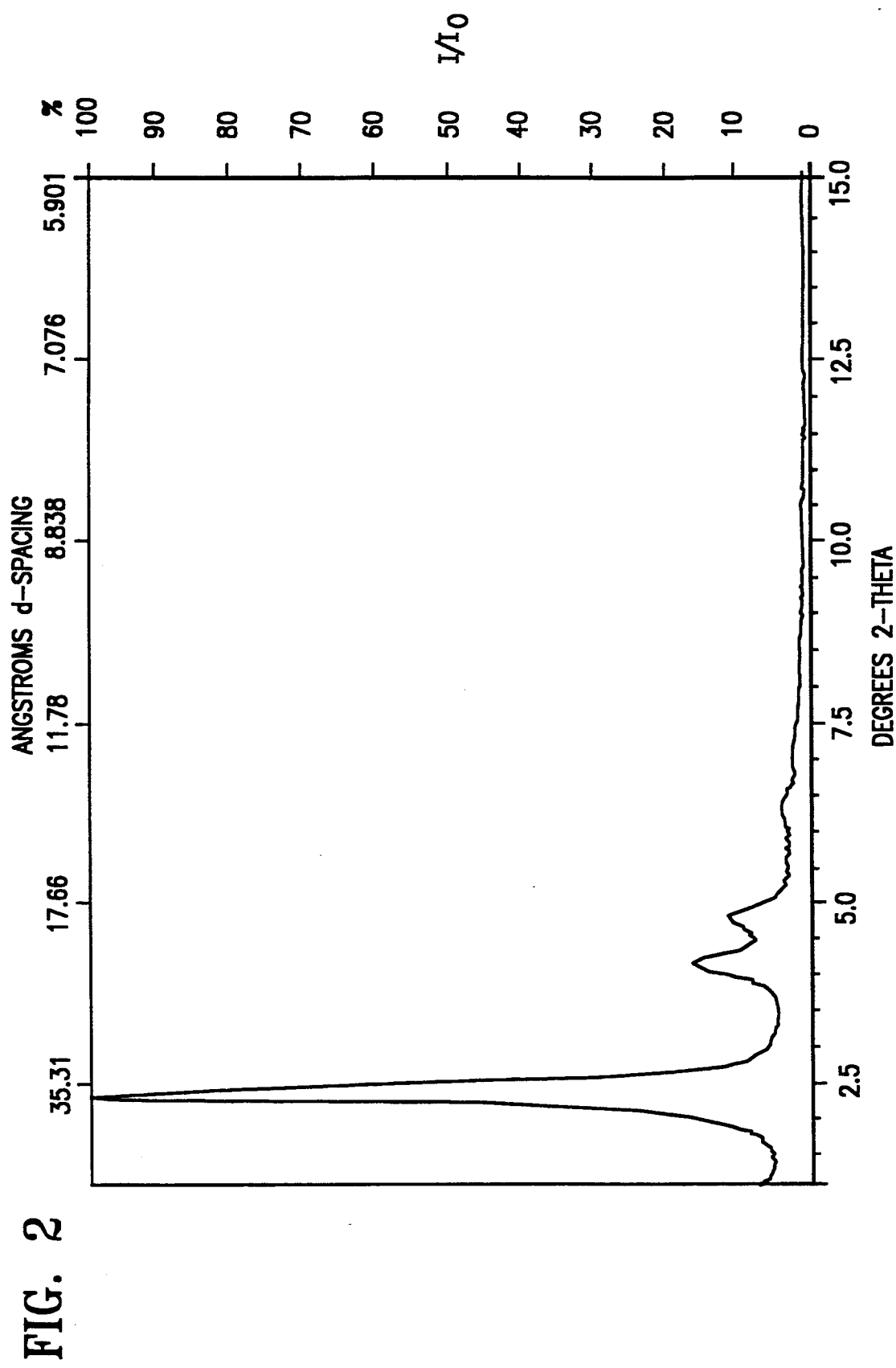
FIG. 2 is an X-ray diffraction pattern of the product of Example 2.

The Example 2 product was prepared by compositing the preparations of 2(A) and 2(B). The x-ray diffraction pattern of the composite is shown in FIG. 2 and is that of very pure M41S.

EXAMPLE 3

A. Two hundred and forty-three grams of a dodecyltrimethylammonium ($C_{12}Me_3N$)hydroxide solution (prepared by contacting a 29% dodecyltrimethylammonium bromide solution with a hydroxide-for-halide exchange resin) were combined with 30 grams of tetraethylorthosilicate, and 306 grams of a 29% (by weight) dodecyltrimethylammonium bromide solution with stirring at approximately 4° C. This mixture was placed in polypropylene bottles and put in a steambox at 100° C. for 48 hours. The resulting solid product was recovered by filtration and dried in air at ambient temperature. The product was then calcined at 540° C. for one hour in flowing nitrogen, followed by six hours in flowing air. X-ray diffraction pattern was that of M41S. Found in the as-synthesized product: carbon-35.4 weight %, aluminum -<0.07 weight %, nitrogen-2.56 weight %, silicon-19.41 weight % and ash (1000° C.) 41.56 weight %.

B. The procedure of 3(A) was repeated and the x-ray diffraction pattern of the calcined product was that of M41S. Found in the as-synthesized product: carbon-33.7 weight %, aluminum-<0.04 weight %, nitrogen-2.37 weight %, silicon-20.4 weight % and ash (1000° C.) 45.17 weight %.

Figure 3:
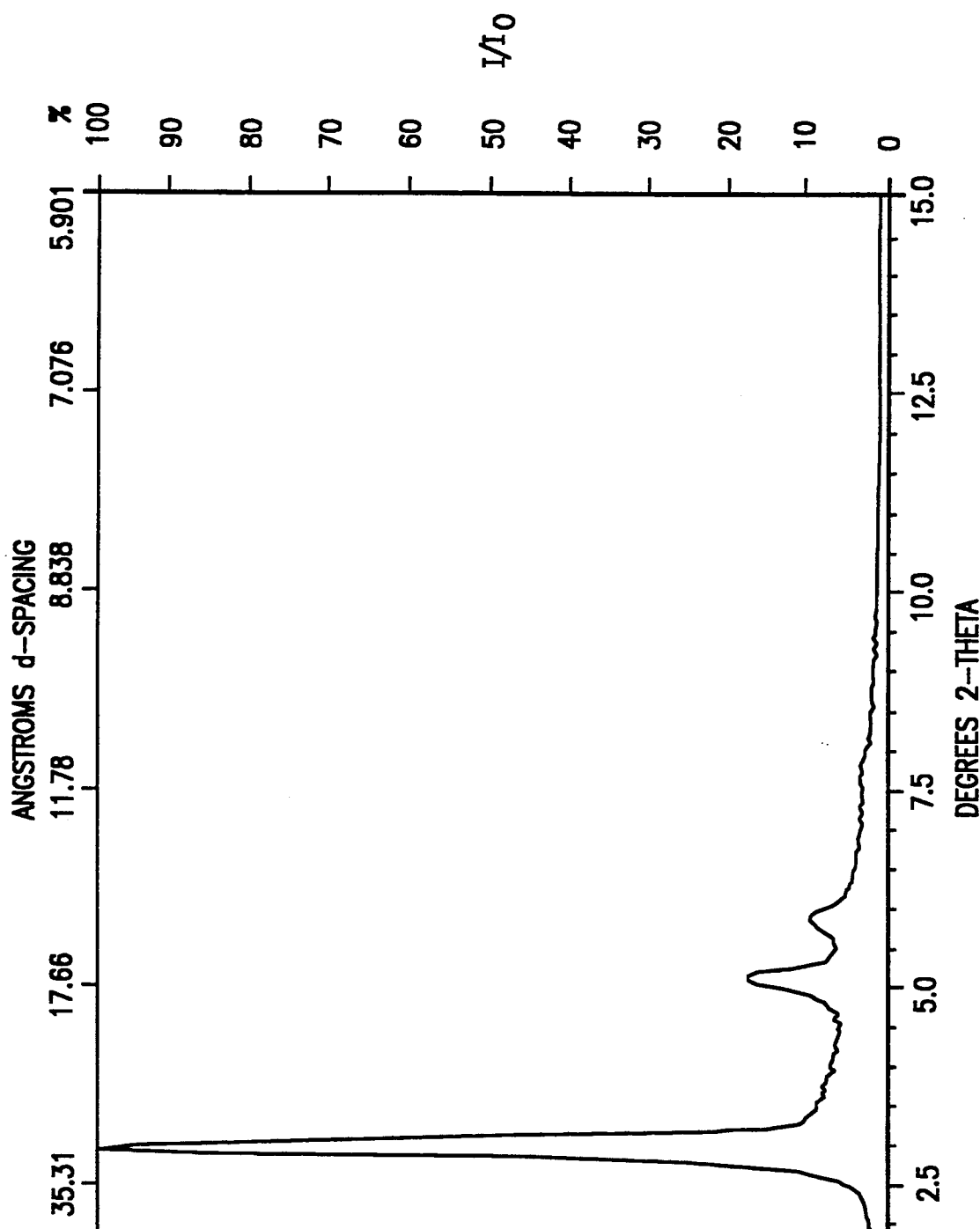
FIG. 3 is an X-ray diffraction pattern of the product of Example 3.

The Example 3 product was prepared by compositing the preparations of 3(A) and 3(B). The x-ray diffraction pattern of the composite is shown in FIG. 3 and is that of very pure M41S.

The products of Examples 1–3 were all suitable for use in the composition of the invention exhibiting nonlinear optical properties.

EXAMPLE 4

$PbI_2$ was loaded into the composite mesoporous M41S product prepared in Example 2. $PbI_2$ was loaded from a melt according to the reaction $PbI_2$ (1)+Mesoporous Host (solid state mixture)=composite when heated to 425° C. and held at that temperature for 20 hours, then slowly cooled. The amount of $PbI_2$ was commensurate with the pore volume, i.e. equal to or less than the pore volume.

EXAMPLE 5

The absorption edge for the product of Example 4 was determined to have an onset at 535 nm and the loaded sample fluoresced at 598 nm. This is consistent with $PbI_2$ which has a bulk absorption band with an onset at 550 nm.

EXAMPLE 6

Another synthetic approach was used. The conditions of preparation of Example 4 were applied, except that the mesoporous material was separated from the bulk $PbI_2$ and vapor from the latter was allowed to diffuse the into the bulk. The temperature of the mesophase was slightly higher than that of the bulk to prevent coating of the outside of the mesophase with bulk $PbI_2$. The bulk temperature was 425° C. and the transfer was carried out over a 20 hour period. The product was then cooled slowly.

EXAMPLE 7

The product of Example 6 was determined to show an interesting spectrum, with the onset of the absorption edge at 490 nm.

Using a pump radiation of 532 nm gave the fluorescence for the product of Example 4 but not for the product of Example 6 since the material absorbs at shorter wavelengths, thus confirming the blue shift. The fluorescence of the second sample was strong and was shifted to correspondingly shorter wavelengths.

EXAMPLE 8

Gallium arsenide was deposited using a conventional metallorganic chemical vapor deposition reactor. The gallium source was trimethylgallium (TMG). The arsenic source was arsine but could be an organoarsine such as trimethyl or tertiary butylarsine. This reagent was mixed with a hydrogen carrier gas which was purified by passing over palladium and passed over the mesoporous sample which was supported on a quartz plate. While the deposition temperature can be between 550° to 750° C., in this experiment it was about 680° C. The total pressure in the reactor cell can be 760–800 torr, and in this preparation it was 770 torr at growth. The growth time was about 400 seconds for the TMG partial pressure of 0.08 tort and a partial pressure of arsine of 0.5 torr. The reactor was heated inductively by a heating coil. After the reaction was completed, the sample was cooled in a stream of arsine since gallium arsenide loses arsenic at elevated temperatures.

EXAMPLE 9

The fluorescence of the product of Example 8 was determined to be blue shifted from the infrared (not visible) into the yellow region at about 600 nm and observable at room temperature.

These examples demonstrate that the compositions of the invention exhibit nonlinear optical properties.

What is claimed is:

1. A composition exhibiting third order nonlinear optical properties, comprising:
    a host material comprising an inorganic, porous, non-layered crystalline phase material exhibiting, after calcination, an arrangement of uniformly sized pores adapted in size, shape and chemical stereo-specificity to fix an inorganic, semiconducting guest material therein in an arrangement to provide nonlinear optical properties, said pores having diameters of at least about 13 Angstrom units, said phase material exhibiting an X-ray diffraction pattern with at least one peak at a position greater than about 18 Angstrom units d-spacing and exhibiting a benzene adsorption capacity of greater than about 15 grams benzene per 100 grams of said phase material at 50 torr and 25° C., and
    quantum size clusters of said guest material incorporated into the pores of said host material.

2. A composition as described in claim 1 wherein said host material is a silicate having a hexagonal arrangement of uniformly sized pores and exhibiting, after calcination, a hexagonal electron diffraction pattern that can be indexed with a $d_{100}$ value greater than 18 Angstrom units.

3. A composition as described in claim 2 wherein crystals of said guest material are grown within said pores.

4. A composition as described in claim 2 wherein said guest material is selected from the group consisting of Periodic Table Groups III–V, II–VI and IV–VI semiconducting compounds.

5. A composition as described in claim 4 wherein said guest material includes gallium arsenide.

6. A composition as described in claim 2 wherein said guest material includes lead iodide.

7. A composition as described in claim 2 wherein the host material is a silicate containing essentially no aluminum.

8. A composition as described in claim 2 wherein said clusters are aggregated within said pores, thereby forming fiber-like strands of said guest material.

9. A composition as described in claim 2 wherein the maximum average diameters of said clusters are of smaller sizes than the diameters of said pores.

10. A composition as described in claim 8 wherein said guest material includes gallium arsenide.

11. A composition exhibiting second order nonlinear optical properties, comprising:

a host material comprising an inorganic, porous, non-layered crystalline phase material exhibiting, after calcination, an arrangement of uniformly sized pores, said pores having diameters of at least about 13 Angstrom units, said phase material exhibiting an X-ray diffraction pattern with at least one peak at a position greater than about 18 Angstrom units d-spacing and exhibiting a benzene adsorption capacity of greater than about 15 grams benzene per 100 grams of said phase material at 50 torr and 25° C., and an organic guest material incorporated into the pores of said host material, said organic guest material displaying non-centrosymmetry and the composition providing second harmonic generation when subjected to electromagnetic radiation of a selected frequency.

12. A composition as described in claim 11 wherein said guest material is selected from the group consisting of organometallic compounds, sorbates and chromophores.

13. A composition as described in claim 11 wherein said host material is a silicate having a hexagonal arrangement of uniformly sized pores and exhibiting, after calcination, a hexagonal electron diffraction pattern that can be indexed with a $d_{100}$ value greater than 18 Angstrom Units.

14. A composition as described in claim 11 wherein crystals of said guest material are grown within said pores.

15. A composition as described in claim 11 wherein said host material is a silicate containing essentially no aluminum.

16. A composition as described in claim 13 wherein the diameters of said pores are sufficiently small with respect to the diameters of said crystals that said pores enhance the orientation of said crystals.

* * * * *